United States Patent Office 3,419,495
Patented Dec. 31, 1968

3,419,495
EXPANDED SILICA INSULATION MATERIAL
Helmut H. Weldes, Havertown, and David I. Netting, Springfield, Pa., assignors to Philadelphia Quartz Company, Philadelphia, Pa., a corporation of Pennsylvania
No Drawing. Filed Apr. 5, 1966, Ser. No. 540,210
7 Claims. (Cl. 252—62)

ABSTRACT OF THE DISCLOSURE

An improved, rigid, inorganic, weather-resistant, non-flammable, siliceous insulation material, which can be formed at low cost by the controlled expansion and gelation of an acidic silicic acid sol using a gelation accelerator and a foaming agent to form the cellular or forameniferous structure. The density, pore size and strength can be controlled over a wide range by simple variations in the composition and treatment and almost any desired shape can be obtained by using molds or the product may be formed directly as a continuous coating on pipes.

PRIOR ART

Plastic foams are increasing in commercial importance. About 150 million pounds of organic plastic of all types were used as insulation in 1962 and about 60 million dollars worth of rigid foams was used in construction in 1961. This market is expanding rapidly. However, these organic foams are flammable and are meeting resistance for approval by fire underwriters. Inorganic foams would be more acceptable to the building trade. These must necessarily have low density and K factor to be of value.

Inorganic foams, such as foamed concrete or a fly ash-clay foam, are difficult to control. They depend on organic foaming agents and the gelation of clays to produce a structure rigid enough to be dried and set. These products tend to distort while drying. On the other hand, our foamed siliceous structures can be handled easily while wet and special drying equipment is not needed since the foam does not collapse.

It has long been known to mix limestone, calcite or dolomite and similar inorganic carbonates with alkali silicate solutions and to heat-treat these so as to release gas in the molten product or to leach out the soluble carbonate from a solid product by the use of acids. Limestone has been added to silica gels and thereafter removed from the hardened product by treatment with acid, and gels formed with $CO_2$ have been broken up and acidified to form a pumice-like material.

The siliceous products of the prior art have all suffered as insulating media, either from high density, large pore diameters, low strength, or combination of such faults. We have now found a means of providing an insulating material of controlled pore size, low density, low K factor, and yet having a green strength satisfactory for normal handling and a fired strength providing reasonable structural strength. The expansion may be controlled to form pre-determined sizes and shapes of insulating material.

The K factor may be further reduced and the cell structure modified so that our product will float on water indefinitely by including specific surface active agents to control the cell size and inter-connection of the pores. Our product has the further advantage that fly ash may be used as a filler and as a setting agent. Fly ash is well known as a by-product of steam industry in over-supply, and there has been much interest in economical outlets for its use.

Our product is useful as a light-weight refractory fire-resistant insulation, for acoustical insulation, and as ceramic foam in ablative material. It is also useful for light weight building blocks and tiles, insulating panels, sandwich panels, insulation which may be foamed continuously in place and indeed as abrasive blocks, etc.

OUR INVENTION

Our process preferably comprises the hereinafter described series of steps but reasonable variations are permissible. An aqueous silica sol having a pH less than about 1.8, and preferably from about 1.0 to 1.4, is formed at an $SiO_2$ concentration ranging from about 10 to 15%. This may most readily be prepared by mixing a dilute soluble silicate into a solution of acid at such a rate as to avoid gel formation. This sol may, if desired, be permitted to age for a time, depending on the concentration, to control the polymerization of the silica and permit better control of the final foam structure. This latter technique is especially useful where slowly acting alkalizing agents, such as fly ash, are used. If, on the other hand, the pH is carefully controlled to a pH of about 1.8, depending on the silica concentration and salt content as well as the overall final concentration, this aging period is not required. The added acidity control agent may be any reactive material more alkaline than a pH of about 1.8, so that the pH of the mixture may be brought to this range. We prefer to use additional soluble alkali silicate for this purpose as well as for the setting agent or gelation accelerator under these conditions.

Should it be desirable to form a buoyant product, with small uniform pores closed to water absorption and having a minimum K factor, we may add a foam control agent. While we have tried a number of surface active agents often found useful in foam control, we prefer the silicone-glycol copolymers. These copolymers are singularly effective in producing a buoyant product in our process. Other silicones may be partially successful.

We next agitate the sol and add a reactive alkaline earth metal carbonate. While we may use magnesium or calcium carbonates, for example, we find that ground natural dolomite or dolomitic limestone is most satisfactory in providing a controlled foam or gas release which attains the extreme expansion of the mass at the same time as the gelation of the overall system. This is the primary objective in our balanced procedure.

We may use other carbonates, such as sodium or ammonium carbonate or bicarbonate, but it is more difficult to control the foaming in these systems and agitation must be provided up to approximately the time of gelation.

After adding the foam producing agent we add any desired filler, or combination of fillers, such as clay, asbestos, fiberglass, perlite, fine sand, diatomaceous earth, etc. This must be added rapidly with enough agitation to be evenly and homogeneously dispersed when the system gels.

Our product is easily removed from a mold as the gel synerizes to a small extent after setting. This shrinking never amounts to more than about 10% (usually 2–4%). If the mold is adjusted to place the foam under some pressure at the time of setting, the pore structure wil be improved and the K factor somewhat lower. The pore diameter will fall between 0.3 and 0.01 cm. in the usual case.

Even before syneresis occurs, the green strength of the gel product is sufficient for normal handling and the foam may be air-dried and used in that state. The foam product may also be fired. On firing, the product shrinks somewhat but since water is removed the product is only slightly more dense while its strength is considerably higher, and the K factor is only slightly increased. (The K factor is given in B.t.u./(hr.) (sq. ft.) (° F./in.) and is thus the British thermal units passing through one inch thickness of a square foot area in one hour with a temperature difference of one degree Fahrenheit. The K factor varies with temperature. At high temperatures of approximately 500° C. a K factor in the neighborhood of 1 is considered good for construction materials, while at 250° C. it should be below 1, and at ordinary temperatures a good K factor will be in the neighborhood of 0.5, and a very good one will be in the range of 0.3).

The final product of our invention is a forameniferous structure having a silica or siliceous bond with a low pH below about 5, a low density in the range of about 12 to 60 pounds per cubic foot before firing and 14 to 25 after firing, and a K factor ranging from about 0.3 to about 1.5. The exact properties depend, of course, on the particular procedure used in the fabrication and finishing of the product as well as in the content and type of fillers employed. The green strength in compression will vary from about 10 to 100 p.s.i. and the fired strength will be in the range of about 50 to 800 p.s.i.

Our product may be used without washing to remove soluble salts. When the product is fired, some of these salts may be driven off and other may cause some fluxing. The remaining salts sometimes are the cause of an efflorescent growth which is easily brushed away. However, if greater purity, freedom from efflorescence, and/or lower shrinkage in firing is desired, the product may be washed either before or after drying by the usual methods to remove soluble salts.

The bond in our product is essentially a silica gel, at least before firing. However, we do not wish to be limited by this and the following statements. While alkaline earth ions are available, the alkaline earth silicates are attacked by acids at the pH at which our bonds form and it is therefore highly unlikely that appreciable amounts of alkaline earth silicate form. Since when clay filler is included the structure is strengthened, there may be aluminum ions available to form aluminum silicates but, again, at the pH of formation this is unlikely. The bond is clearly non-vitreous, that is the bond, though usually amorphous, is free of glass such as is formed on melting siliceous compositions.

THE COMPONENTS

The silica sol is obtained most economically by acid neutralization of sodium silicate. Any acid may be used but the most economical are the usual acids of commerce such as sulfuric or hydrochloric acid, and no specific description is required.

In carrying out our development we have ordinarily used "N" sodium silicate. This has about 28.7% $SiO_2$ and an $SiO_2:Na_2O$ ratio by weight of about 3.22. However, any other soluble silicate, including lithium, sodium, potassium, cesium, rubidium, or organic alkali silicates, will be satisfactory since it is only necessary to neutralize the alkali and reduce the pH below about 1.8 without forming a gelatinous composition. In general, soluble silicates which will permit the preparation of a silicic acid sol of a high silica concentration will tend to provide a stronger structure. For this reason, the quaternary ammonium silicates or lithium silicates will tend to provide a product with greater strength. We may substitute any other form of silica sol having reasonable stability at a low pH. For instance, sols made by treating alkali silicates with a base exchange resin, or by neutralization and removal of extraneous salt, or peptization of a silica gel, and condensed silica sols at high concentrations may be used.

The best starting concentration of the alkali silicate is about 20 grams of $SiO_2$ per 100 ml. and sufficient acid is usually added to bring the final pH to about 1.1. The final concentration of the silica should be about 12.5 grams of $SiO_2$ per hundred ml. under the conditions with which we have usually worked, but a range of 10 to 15% or more of $SiO_2$ may be used. These concentrations may be varied as the other conditions are varied. Under the above specific conditions, the optimum aging time for silica sols formed from sodium silicates of different ratios is as follows:

| $SiO_2:Na_2O$ | Aging time, hrs. |
| --- | --- |
| 3.75 | 3.75 |
| 3.22 | 3 |
| 2.54 | 2.5 |
| 2.0 | 2 |

If the silica sol is aged for too long a time it becomes so viscous that the fillers and blowing agent are not readily dispersed and the foam is uneven, whereas if not sufficiently aged the gas will escape and the high density will result.

A stable foam having small regular pore sizes is more likely to result if wetting agents and/or foaming agents are added. These make the production of the foam easier and tend to maintain the foam structure during the period when the silica gel is setting. In general about 0.1%–0.5% of these reactants, based on the acid sol, is necessary and the diameter of the pores will fall between 0.1 and 0.001 cm. in nearly all cases.

The silicone-glycol copolymer foaming agents are especially satisfactory as they appear to aid in forming gas cells which are closed at the time of gelation, and the resulting foam will therefore float indefinitely on water, whereas with most other wetting or foaming agents the pores appear to be inter-connected and the foam does not float for more than a few minutes. The closed pore systems tend to have a lower K factor and are therefore preferred. Examples of these silicone-glycol copolymers are Dow Corning 113 and 201.

The stabilization of the foam may also be controlled to some extent by controlling the viscosity of the fluid acid sol phase. One way to control this is to age the sol until the viscosity has increased to a point short of gelation. It is also possible to raise the pH to 1.8 or higher to step up the rate of polymerization of the silica in the acid sol. The use of foam stabilizers and pH control together is especially useful in forming foams with a low K factor.

As a foaming agent, we prefer dolomite but the alkaline carbonate chosen as a foaming agent is not critical. Since there is some variation in the composition, allowance will need to be made for such differences as may be met. We have used industrial pulverized dolomitic limestone or a high calcium limestone. We have also used ammonium bicarbonate and calcium carbonate and sodium bicarbonate or carbonate.

When using ammonium carbonate the mixture foams strongly as the $CO_2$ is released. While a good foam was developed, the mixture had to be strongly agitated right up to the time gelation occurred. With pulverized dolomiric limestone, however, the foam develops slowly over 30 minutes or longer without agitation. This gives a slower reacting alkali, such as that obtainable from some types of fly ash, a chance to bring about gelation at the proper time. It also permits the dolomite to be predispersed in the acid sol before adding the filler. The foam is then much more uniform. Calcium carbonate itself reacts faster than the dolomite and is therefore less easily controlled.

Any alkaline earth carbonates, as well as the alkali carbonates such as ammonium, potassium or sodium carbonate or lithium carbonate may be used. These alkali carbonates react very quickly with the acid in the silica sol and the gas is evolved quickly so that the filler should be added before the foaming agent.

The gelation accelerator functions to ensure the setting of the gel at the desired foam volume. The pH of the silica sol has to be brought high enough so that the alkali released from the salt gels the silica sol in a few seconds, or at the moment the foam structure is at an optimum. If the pH of the acid silica sol is too low, the amount of a carbonate salt needed to cause rapid gelation has to be increased greatly. This greatly increases the amount of gas evolved and before the silicate can gel the mixture may be blown apart. At too high a pH the amount of carbonate salt is too low and the silica sol gels before the foam can develop properly. Dolomite changes the pH of the acid silica sol by about only 0.25 pH units while forming the gas for blowing the foam. Thus when dolomite is used, the pH may be controlled not by the blowing agent but by a gelation accelerator. Fly ash is, of course, available in excessively large quantities as a by-product of steam plants burning powdered coal. Considerable effort has gone into finding economical uses for this by-product. We have found that fly ash acts as a combined gelation accelerator (alkalizing or setting agent) and filler and is very effective in our product. We expect large quantities of fly ash may be used in this way. However, it is well recognized that fly ash varies over a considerable range of compositions, some being much more alkaline than others. We have used fly ash from The Philadelphia Electric Co. Fly ash A had over 90% of −320 mesh screen size material with a bulk density of 53.7 lbs./cu. ft. and a pH 8.5. Fly ash B, on the other hand, had about 70% of −320 mesh screen size material with a bulk density of 68.8 lbs./cu. ft. and a pH of 11.6. By titration over a long period it was found that fly ash B contained 0.008% of $Na_2O$ titrated to a pH of 7.7 whereas the titratable alkali of A was negligible but base exchange activity was high.

Typical ranges of fly ash composition are:

| | Percent |
|---|---|
| $SiO_2$ | 34–48 |
| $Al_2O_3$ | 17–31 |
| $Fe_2O_3$ | 6–26 |
| CaO | 1–10 |
| MgO | 0.5–2 |
| $SO_3$ | 0.2–4 |
| Ignited loss (C) | 1.5–20 |

We believe that some fly ash acts as a gelation accelerator by a base exchange reaction of the alkali of the fly ash with the acid of the sol while other ash merely neutralizes the acidity. The amount of ash is regulated to provide gelation at the time of maximum foaming by the foaming agent. In the case of dolomite in the compositions we have used, this time is approximately 30 minutes. The more alkaline fly ash B with a pH of 11.2 apparently acts more like a source of free alkali. Fly ash A, on the other hand, with a pH of 4.2 in water, caused more rapid gelation than fly ash B and acted like an ion exchange zeolite. Thus we have found that when using the required amount of dolomite in a given acid sol, only 30 parts of fly ash A (that is the more acidic fly ash) is sufficient to bring about gelation, whereas 70 parts of fly ash B is required and the initial pH should be lower to give time for the mixture to expand before gelling.

Fly ash, of course, may be eliminated as a setting agent and another source of alkali used to raise the pH. In this case we found it best to raise the pH of the acid sol to about 1.8 before adding the dolomite. The reaction of the dolomite alone was then sufficient to cause gelation at the proper time. The proper balance of acid and alkali will need to be worked out for the materials in each application. By this procedure much production time may be saved.

The filler is a matter of choice depending on the properties desired in the product. We prefer to add about 0.4 to 5% of the total composition as fibrous filler. Smaller amounts do not give the foaming mixture the proper body and the gas tends to escape out of the mixture. Larger amounts form lumps and the foam is not uniform. An organic binder may be used in place of the fibers to stick the fillers together if it is water soluble at a low pH and does not prevent the silica sol from gelling. The best fibrous material is an inorganic fiber such as glass, asbestos, and alumina-silica ceramic called "Fiberfrax" sold by Carborundum Co.

Another part of the filler is usually a clay, fine silica or sand, plaster of Paris, and/or vermiculite. These are used in amounts to give the desired strength and density. Clay tends to increase the strength while perlite decreases the density but also decreases the resistance to water. The amounts may vary from about 0 to 50% of the composition. When fly ash is used to control gelation, the residue may form the major amount of filler, that is up to about 50% of the composition.

The strength of the foam, either fired or air dried, is closely dependent on the density. As the density increases, the strength of the foam also increases but at a somewhat faster rate. Lowest densities can be obtained using perlite and similar fillers. These foams tend to be weaker but are satisfactory for insultion foamed in place.

Plaster of Paris may also be used as the filler. With plaster of Paris the density is lower but, of course, the foam cannot be fired. The fired strength of fly ash foam is much higher than that in the cold set strength of plaster of Paris foams. Also foams developed by strong agitation tend to be non-uniform in structure and therefore less strong.

TESTING

The dried foams were tested for their resistance to compression using a Thwing-Albert Electro-Hydraulic Tensile Tester. The blocks of foam were cut in half and the strength of one measured before firing and the other after firing. The shrinkage was determined by direct measurement with the block before and after firing.

EXAMPLE 1

100 parts by weight of "N" sodium silicate was diluted with 72.6 parts by weight of water. One-half of this diluted sodium silicate was poured into 55.6 parts by weight of 39% sulfuric acid (specific gravity 1.29) with strong agitation. Then 43 additional parts by weight of water was added to the remaining diluted silicate before adding it to the acid. In this way lumps of gel were avoided and the silica sol had a pH of about 1.10. This sol was aged for between 3 and 4 hours. After 4 hours it is likely to gel and be unsatisfactory.

Next, 34.5 parts by weight of industrial pulverized dolomitic limestone was dispersed in the acid silica sol. Following this, 161 parts by weight of fly ash B was added along with 69 parts by weight of Barden clay, obtained from J. M. Huber Co. (pH 4.5 to 5.0) and 6.9 parts by weight of acid-washed asbestos fibers. Barden clay is an air-separated South Carolina kaolin with 80 to 85% by weight less than 2 microns in particle size. The mixture was stirred vigorously while the fillers were added and stirring was stopped as soon as the mixture was uniform. This took about 30 seconds. The mixture expanded until is was 5 times its original volume. This occurred at about 30 minutes at which time the silica sol gelled. The gel shrank slightly on standing and was easily removed from the mold. The molded foam could be handled shortly after gelation and developed additional strength on air drying. Slow drying is desirable to avoid cracking. Most of the water can be removed in about 12 hours with forced air drying, whereas drying in the oven at 105° C. will take about 6 to 8 hours. The foam may then be sawed or milled into the required sizes. This foam had a density of about 27.8 lbs. per cu. ft. with a strength of 20 p.s.i. After firing at 1150° C. the density was about 27.4 lbs. per cu. ft. and the compressive strength was about 140 p.s.i. At 24° C. the K factor was about 0.6 whereas at 500° C. the K factor was about 0.8.

Two similar foam structures were formed; one with a perlite filler and the other with a clay filler. The perlite foam air-dried had a density of 18.9 pounds per cu. ft. whereas the clay-filled foam fired at 1150° C. had a density of 25.9 lbs. per cu. ft. They had the following K factors:

| Mean temperature, ° C. | Perlite | Clay |
|---|---|---|
| 234 | 0.81 | 0.90 |
| 450 | 1.32 | 1.29 |

These K factors would be considered as fairly good but they are indicative of an open cell structure and may be considerably improved. The compressive strength of the perlite filled product was 25 p.s.i. and that of the fired clay filled product was 125 p.s.i.

EXAMPLE 2

A foam structure with closed cells was formed with a silicone-glycol copolymer, Dow-Corning 113. With all other foam control agents tried, the cells were open and the foam sank when floated on water. With the Dow-Corning 113 the cells were closed since although the block of foam retained only 0.1% by weight of the Dow-Corning 113 based on the acid silica sol, it floated for three weeks without becoming water-logged or sinking lower in the water. The other surface active agents could control the cell size. Some formed foams with very small cells which still sank very rapidly in water.

In this example 697 grams of N sodium silicate was diluted to 1,000 ml. by volume giving a concentration of 20 grams of $SiO_2$ in 100 mls. Half of this diluted sodium silicate was poured slowly but with strong agitation into 300 ml. of sulfuric acid solution at a concentration of 50 grams of $H_2SO_4$ per hundred ml. The remaining diluted silicate was further diluted with 300 ml. of water and then poured into the acid solution. Thus a sol at about 10% $SiO_2$ was formed without any lumps of gel.

Next 0.1% of Dow-Corning 113, based on the silica sol, was mixed into the sol and preparation of the foam was continued without aging. After 1.5 grams of glass fibers per 100 ml. of acid silicate were dispersed in the sol, the dolomitic limestone was added in a ratio of 15 parts by weight to 100 parts by volume and mixed with strong agitation. While still stirring strongly, a mixture of 70 parts by weight of fly ash B and 30 parts by weight of Barden clay (based on 100 parts by volume of silica sol) were added together and stirring continued for about a half minute until the mixture was uniform. The mixture expanded for about 15 minutes until it was three times its original volume when the silicate set to a gel. The gel slowly shrank away from the sides of the mold and was easily removed without cracking.

Any efflorescence which formed during drying, caused by the presence of water soluble salts, was easily brushed away. In this case the efflorescence was sodium sulfate. The foam had a bulk density of 25 lbs. per cu. ft. and a compression strength (air-dried) of 25 p.s.i. The K factor was found to be about 0.6 at 24° C. Unfired foam slabs with clay filler were made with densities varying from about 14 lbs. per cu. ft. to 26 lbs. per cu. ft., and with perlite from about 18 to 25 lbs. per cu. ft.

EXAMPLE 3

In this example a silica foam was formed without the fly ash gelation accelerator. 257 parts by weight of water were mixed with 348 parts by weight of N sodium silicate. One-half of the diluted sodium silicate was poured into 110 parts by weight of 39% sulfuric acid which was being strongly agitated. 190 additional parts by weight of water were added to the remaining diluted sodium silicate and then added to the partially neutralized acid with continuing strong agitation. No gel formed. This silica sol with about 11% $SiO_2$ had a pH of about 1.8. It should not gel before about 8 hours.

To prepare the foam, 8 parts by weight of a 10% Dow-Corning 113 solution was added to the acid silica sol. Next, 120 parts by weight of pulverized dolomitic limestone were stirred into the mixture. Immediately thereafter 560 parts by weight of sand flour, 245 parts by weight of clay, and 12 parts by weight of glass fibers were added with strong mixing until the mixture was uniform. This took about 30 seconds. The mixture was then poured into a mold and expansion began promptly. The silica sol gelled within about 15 minutes when the original volume had been increased two times.

EXAMPLE 4

Silica foam was prepared using a soluble organic ammonium silicate. The sol had a pH of 0.8 at a concentration of 30 grams of $SiO_2$ per hundred ml. and was formed from tetraethanolammonium silicate having a ratio of 9.29 mols of $SiO_2$ to 1 of tetraethanolammonium ion. Plaster of Paris and asbestos fibers were used as the filler. To these were added either ammonium bicarbonate or sodium bicarbonate as desired, but in either case the mixture had to be strongly agitated. Usually half of the foaming agent was added to raise the pH to 3.5 before the fillers, and the other half was added after the fillers, and stirring was continued until gelation occurred. The blowing agent was varied from about 3 to 6 grams per hundred milliliters of sol. The plaster of Paris was varied from 25 to 50 g. and asbestos fiber from 1 to 3 g. per hundred ml. of sol. The density of these products varied from about .28 to .55 gram per cu. centimeter; that is, from about 17 to 34 pounds per cu. ft. Compressive strength unfired varied from about 15 p.s.i. to about 113 p.s.i. When sodium silicate was used to form a sol at about 13 grams of $SiO_2$ per hundred ml., using the same foaming agents, the bulk density varied from about 14 lbs. per cu. ft. to about 24 lbs. per cu. ft., and the compressive strength from about 6 to 20 p.s.i.

EXAMPLE 5

In this example the silica sol with 12.5 g. $SiO_2$ per 100 ml. and pH 1.1 was formed using sodium silicate having a ratio of 3.75 $SiO_2$ to 1 $Na_2O$ by weight. After aging for three hours the pH was adjusted to 2 and calcium carbonate was added as a foaming or blowing agent in the amount of 5 grams per hundred ml. and asbestos fibers in the amount of about 2 grams per hundred ml. Fly ash A was used in amounts varying from 75 to 125 grams per hundred ml. of sol. Bulk densities obtained varied from about 28 lbs. per cu. ft. to 55 lbs. per cu. ft. and the fired compressive strength varied from about 140 p.s.i. to 250 p.s.i. With ammonium bicarbonate as the foaming agent and 50 grams of a common brick clay, a compressive strength of 345 p.s.i. at 32 lbs. per cu. ft. after firing was obtained. When 100 parts by weight of the common brick clay and no fly ash was used, with calcium carbonate as the foaming agent, a bulk density of 56 lbs. per cu. ft. and a fired strength of 770 p.s.i. was determined. Shrinkage caused by firing varied from about 8 to 20%, being greater with the lower density materials.

Thus we have been able to form a novel expanded or forameniferous product with a siliceous bond by a process of forming a foam in a silica sol and bringing about gelation at the time of optimum foam formation. In the starting sol the silica content may vary from about 5 to 50% $SiO_2$, the initial pH may vary according to the reactants but in general should be initially near 1 and may be about 1.8 or higher when the foaming agent is added. Unless the pH of the acid silica sol is adjusted to 1.8 or higher, the sol ordinarily should be aged for up to about three hours, or until gelation is imminent. As foaming agents we prefer to add salts which release $CO_2$ at an acid pH and prefer to add from 5 to 15 parts by weight based on 100 parts by volume of the sol, depending on the pH and source of $CO_2$.

In order to further stabilize and maintain the foam structure before gelation we add from about 0.4 to 5% (based on the total composition) of inorganic fibers and from 0 to 50% of other fillers such as clay, perlite, sand, plaster of Paris, etc. depending on the density and strength or other property required.

A gelation accelerator, usually in the form of fly ash or other reagent which will raise the pH and bring about gelation at the desired foam structure, may be added if the carbonate salt itself does not of itself properly adjust the gelation time. From 30 to 50% of fly ash is usually included.

The final foramenifereous siliceous bonded product has a pH of about 4 to 6, a K factor of about 0.3 to 1.5, and a bulk density of about 12 to 60 lbs./ft.$^3$, and may be capable of floating indefinitely in water. The green strength varies from about 6 to 115 p.s.i. and the fired compressive strength from about 40 to 800 p.s i. Necessarily the exact values obtained will depend on the fillers and procedures employed.

More or less detailed claims will be presented hereinafter. Even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple routine non-inventive experimentation. Certainly no invention would be involved in substituting one or more of each obvious equivalents for the materials specifically recited in the claims. It is intended that all such obvious equivalents be encompassed within the scope of this invention and patent grant in accordance with the well known doctrine of equivalents as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What we claim is:

1. The process of forming a foramenifereous siliceous product comprising an incombustible, fire resistant, foamed composition having a nonvitreous synerized siliceous bond which comprises:
   (a) forming an intimate admixture of components consisting essentially of;
      (1) an acidified aqueous silica sol having a $SiO_2$ concentration ranging from about 5 to 50% and an initial pH within the range of about 1.0–1.8;
      (2) 5 to 15 parts by weight, based on 100 parts by weight of the sol, of a carbonate salt selected from the group consisting of alkali metal and alkaline earth metal carbonates that is capable of reacting with said sol and releasing carbon dioxide, and
      (3) .4 to 50% by weight, based on the total weight of the composition of a non-reactive filler to increase the compressive strength
   (b) maintaining the above components (1), (2) and (3) in intimate admixture until the components (1) and (2) react and release carbon dioxide and the intimate admixture expands in volume,
   (c) maintaining the viscosity of said aqueous silica sol at a point of incipient gelation shortly prior to and during at least the initial period of time that the release of carbon dioxide is taking place
   (d), thereafter causing said silica sol to gel and the gel to set at the desired foam volume, and
   (e) drying the resulting expanded mass.

2. A product produced according to the method of claim 1.

3. A product produced according to the method of claim 1 which is characterized by:
   (a) a K factor at 30° C. less than about 1.0;
   (b) a bulk density between about 10 and 50 pounds per cubic foot;
   (c) a green compressive strength above about 15 p.s.i. and a compressive strength above about 125 p.s.i. after firing.

4. A product according to claim 3 which has a closed pore structure.

5. A product produced according to the method of claim 1 which additionally contains a filler selected from a group consisting of fine sand, clay, perlite, diatomaceous earth, asbestos fiber, glass fiber, ceramic fiber and carbon fiber.

6. The process of claim 1 in which a silicone-glycol copolymer is added to stabilize the foam.

7. The process of claim 1 in which fly ash is used as a gelation accelerator.

References Cited
UNITED STATES PATENTS

| | | | |
|---|---|---|---|
| 2,914,413 | 11/1959 | Mercer | 106—40 X |
| 2,992,930 | 7/1961 | Wheeler et al. | 106—75 X |
| 3,024,125 | 3/1962 | Lee | 106—84 X |
| 3,133,821 | 5/1964 | Alford et al. | 106—40 |

LEON D. ROSDOL, *Primary Examiner.*

I. GLUCK, *Assistant Examiner.*

U.S. Cl. X.R.

252—313; 260—2.5; 106—122, 84, 75, 40